United States Patent [19]
Wakabayashi et al.

[11] Patent Number: 4,697,901
[45] Date of Patent: Oct. 6, 1987

[54] PARALLAX CORRECTING DEVICE IN THE FINDER OF A CAMERA

[75] Inventors: Hiroshi Wakabayashi, Yokohama; Koichi Wakamiya, Tokyo, both of Japan

[73] Assignee: Nippon Kogaku K. K., Tokyo, Japan

[21] Appl. No.: 819,609

[22] Filed: Jan. 17, 1986

[30] Foreign Application Priority Data

Jan. 30, 1985 [JP] Japan .................................. 60-15794

[51] Int. Cl.4 ........................ G03B 13/14; G03B 13/10
[52] U.S. Cl. ...................................... 354/221; 354/222
[58] Field of Search ............... 354/164, 221, 222, 400, 354/409

[56] References Cited

U.S. PATENT DOCUMENTS

| | | | |
|---|---|---|---|
| 2,737,844 | 3/1956 | Jerome et al. | 354/221 |
| 3,011,385 | 12/1961 | Frost | 354/222 |
| 3,357,328 | 12/1967 | Kinder et al. | 354/222 |
| 3,393,623 | 7/1968 | Gutmann et al. | 354/222 |
| 4,400,071 | 8/1983 | Tamura et al. | 354/409 |
| 4,478,493 | 10/1984 | Yokota | 354/164 X |
| 4,576,458 | 3/1986 | Cho et al. | 354/222 X |

FOREIGN PATENT DOCUMENTS 17545 1/1984 Japan .................................. 354/409

Primary Examiner—Donald A. Griffin
Attorney, Agent, or Firm—Shapiro and Shapiro

[57] ABSTRACT

A camera comprises a photo-taking lens system having an optic axis and movable along the optic axis for focusing, a view finder means including an objective having an optic axis different from the optic axis of the photo-taking lens system, first view field indicating means provided to indicate the range of a photographing picture plane obtained when an object to be photographed lying in a predetermined distance range is photographed within an observation view field formed through the objective, and second view field indicating means provided to indicate the range of a photographing picture plane obtained when an object to be photographed lying outside the predetermined distance range is photographed within the observation view field, and preventing means responsive to movement of the photo-taking lens system to prevent viewing of at least a part of the second view field indicating means when the photo-taking lens system is focused to the object to be photographed lying in the predetermined distance range.

10 Claims, 15 Drawing Figures

PARALLAX CORRECTING DEVICE IN THE FINDER OF A CAMERA

BACKGROUND OF THE INVENTION

1. Field of the Invention

This invention relates to a parallax correcting device in the finder of a camera, and in particular to a parallax correcting device in the finder through which an object to be photographed within the view field can be observed with a view field frame superposed on the object to be photographed.

2. Description of the Prior Art

In a camera having a see-through finder, a photo-taking lens and a finder objective are provided at positions spaced apart from each other and therefore, parallax occurs between the photographing picture plane and the finder view field. As the simplest means for modifying this parallax, there is known a device comprising a view field frame observably provided within the finder view field, and an auxiliary view field frame for short distance photographing added to the view field frame. In this finder, however, the view field frame for long distance photographing and the view field frame for short distance photographing are seen within the finder view field at the same time, and this is onerous during the framing and it may often happen that in spite of the short distance photographing, the photographing range is determined by the view field frame for long distance photographing, thus resulting in a failure of photographing.

In order to eliminate the above-noted disadvantage, there is also known a camera in which a view field frame provided within the view field of an albada finder or a bright frame finder having a lighting window is displaced in operative association with the axial movement of a photo-taking lens for distance adjustment to thereby automatically modify parallax. In this camera, however, there is a disadvantage that framing cannot be accomplished unless the distance adjusting operation of the photo-taking lens is completed. Particularly, where the automatic parallax modifying device as described above is provided in an automatic focus adjustment camera capable of photographing up to the short distance range, the view field frame is operatively associated with the photo-taking lens and therefore, if the photographer forgets that the object to be photographed lies at a short distance, the view field frame will be greatly displaced simultaneously with the distance measurement after framing, and this leads to a disadvantage that framing must be again effected.

SUMMARY OF THE INVENTION

It is an object of the present invention to overcome above-noted disadvantages peculiar to the device according to the prior art and to provide a parallax correcting device which enables the framing before distance adjustment to be accomplished and also enables framing to be confirmed simultaneously with the distance adjustment.

To achieve the above object, the camera of the present invention provided with a finder comprising a main view field frame and a view field frame for parallax added thereto is provided with shield means for covering at least a part of the main view field frame in response to the movement of the photo-taking lens in the direction of the optic axis for photographing distance adjustment, and is constructed so that the unnecessary view field frame is deleted from within the view field in conformity with the photographing distance.

DESCRIPTION OF THE PREFERRED EMBODIMENTS

Figure 1:
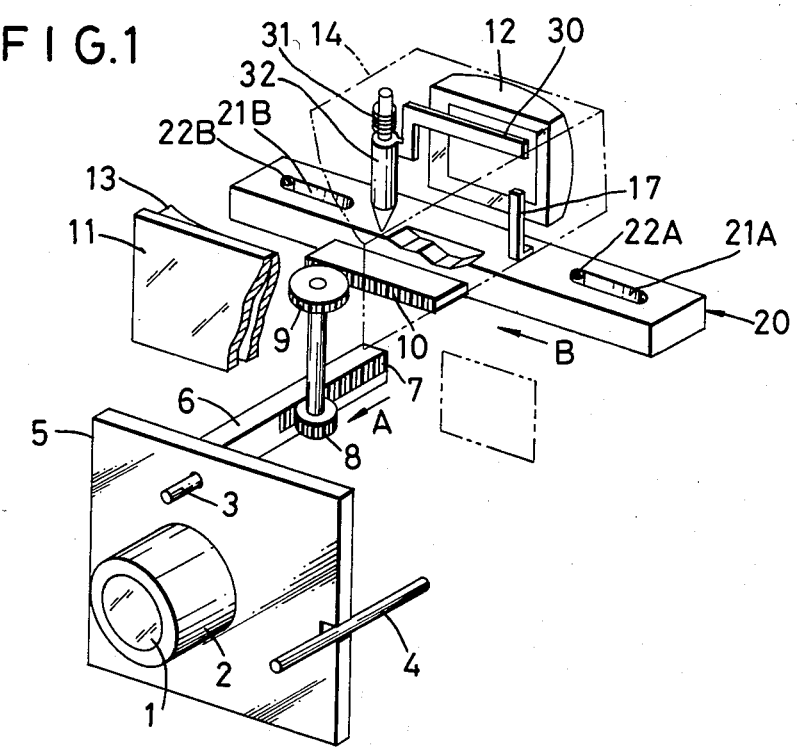
FIG. 1 is a perspective view showing a first embodiment of the present invention.
Figure 2:
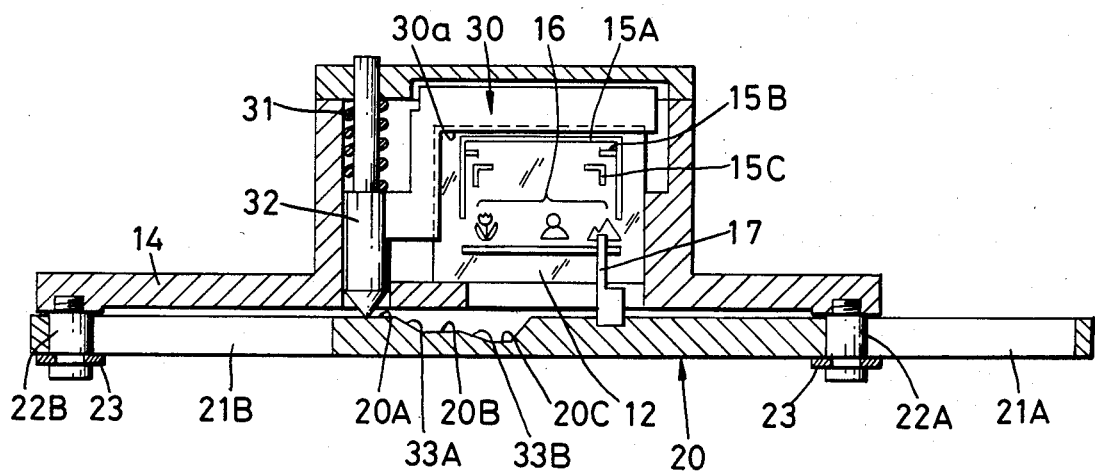
FIG. 2 is a cross-sectional view of the shield plate moving mechanism of FIG. 1.

FIG. 1 is a perspective view showing an embodiment of the present invention, and FIG. 2 is an enlarged transverse cross-sectional view of a shield plate moving mechanism provided in the finder eyepiece portion of FIG. 1. In FIG. 1, a lens barrel 2 holding a photo-taking lens 1 is secured to a base plate 5 guided for movement in the direction of the optic axis by two guide shafts 3 and 4. An interlocking strut 6 elongated in the direction of the optic axis is secured to the back of the base plate 5, and a first rack 7 is provided on a side of the interlocking strut 6. The movement of the first rack 7 in the direction of the optic axis is transmitted to a second rack 10 through interlocking gears 8 and 9 and, when the first rack 7 is moved obliquely downwardly as viewed in FIG. 1 (in the direction of arrow A) with base plate 5, the second rack 10 may be moved to the left (in the direction of arrow B). The second rack 10 is secured to a side of a pointer bed 20 to be described in detail which is slidably supported on the underside of a finder box 14 holding a finder optical system 11–13.

The finder optical system comprises a negative objective 11, a positive eyepiece 12 having a planar inner surface, and an albada mirror (a translucent concave mirror) 13 having its concave surface facing the eyepiece 12 and disposed rearwardly of the objective 11, and constitutes an albada finder. On the inner planar surface of the eyepiece 12, as shown in Figure 2, a main view field frame 15A for a long distance range, an auxiliary view field frame 15B for a short distance range assuming a different position in conformity with parallax and a view field frame 15C for a proximity range are provided as a bright frame, and further, a distance zone mark 16 indicating the range of an object to be photographed which is imaged in the photographing picture plane is provided in the lower portion of the view field. The distance zone mark 16 is formed of a silver-plated surface like the view field frames, and comprises a "mountain" symbol representing the long distance range including infinity, a "half figure" symbol representing the short distance range and a "flower" symbol representing the proximity range, and the distance indicating symbol row of this distance zone mark 16 is indicated by a distance pointer 17 proximate thereto and movable to the left and right through the finder box 14.

The distance pointer 17 is provided on the upper surface of pointer bed 20 to which the second rack 10 is secured, as shown in FIG. 1. The pointer bed 20 has guide slots 21A and 21B elongated in the left to right direction as viewed in FIG. 1, and is slidably held on the underside of the finder box 14 by guide pins 22A and 22B extending through the guide slots 21A and 21B, respectively, and clips 23, as shown in FIG. 2. A shield plate 30 vertically displaceable so as to cover the upper portion of the main view field frame 15A and the auxiliary frame 15B is provided immediately in front of the eyepiece 12. The shield plate 30 is formed integrally with a stylus 32 vertically slidably supported on the finder box 14 and downwardly biased by a compression coil spring 31, as shown in FIG. 2.

The lower end of the stylus 32 protrudes from the underside of the finder box 14 and is engaged with the upper surface 20A of the pointer bed 20. Two stepped portions 20B and 20C are formed on the pointer bed 20 through inclined surfaces 33A and 33B continuous to the upper surface 20A and, when the pointer bed 20 is moved to the left, the stylus 32 may slide downwardly following the inclined surfaces 33A and 33B to thereby lower the shield plate 30. In FIG. 2, when the distance pointer 17 moves with the pointer bed 20 from the long distance range symbol (mountain) position of the distance zoom mark 16 to the short distance range symbol half figure) position, the stylus 32 lowers from the upper surface 20A of the pointer bed 20 along the inclined surface 33A and arrives at the first stepped portion 20B, and at that time, the shield plate 30 lowers to a position in which it covers the upper portion of the main view field frame 15A, and further, when the distance pointer 17 points to the proximity range symbol (flower), the stylus 32 moves along the inclined surface 33B and comes into engagement with the second stepped portion 20C, and at that time, the shield plate 30 covers the auxiliary frame 15B.

Figure 3:
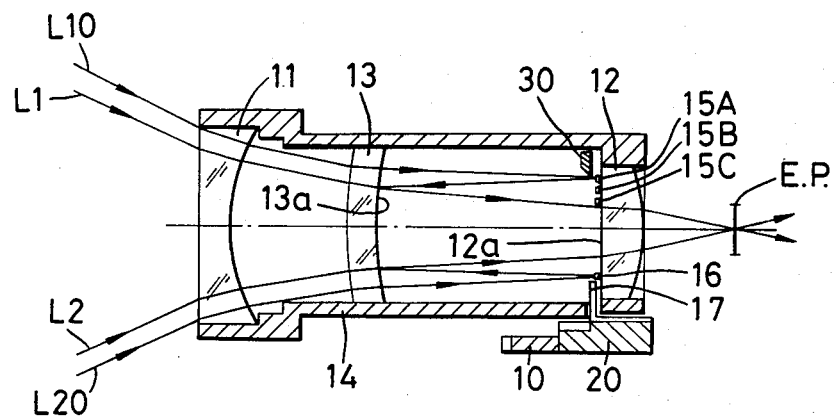
FIG. 3 is a cross-sectional view of a finder optical system used in the embodiment of FIG. 1.

FIG. 3 is a cross-sectional view of the finder portion. Illuminating light L10 which illuminates the view field frames provided on the forward planar surface 12a of the eyepiece 12 is transmitted through the objective 11 and the translucent concave mirror 13 and arrives at the view field frames 15A-15C. The reflected light from the view field frames 15A-15C is again reflected by the half-transmitting surface 13a of the albada mirror 13 and is directed toward an eye point E.P. with the light beam L1 from the object to be photographed. Illuminating light L20 which illuminates distance zone mark 16 and distance pointer 17 provided on the lower portion of the planar surface 12a of the eyepiece 12 is likewise again reflected by the half-transmitting surface 13a of the albada mirror 13 and is directed toward the eye point E.P. with the light beam L2 from the object to be photographed. At that time, the optical images of the view field frames 15A-15C and the distance zone mark 16 and the dark image of the distance pointer 17 formed on the lower edge of the main view field frame 15A and the distance zone mark 16 are enlarged by the concave surface 13a of the albada mirror 13 and the eyepiece 12 and are observed with the image of the object to be photographed at the clear vision distance of the observing eye.

Figure 5:
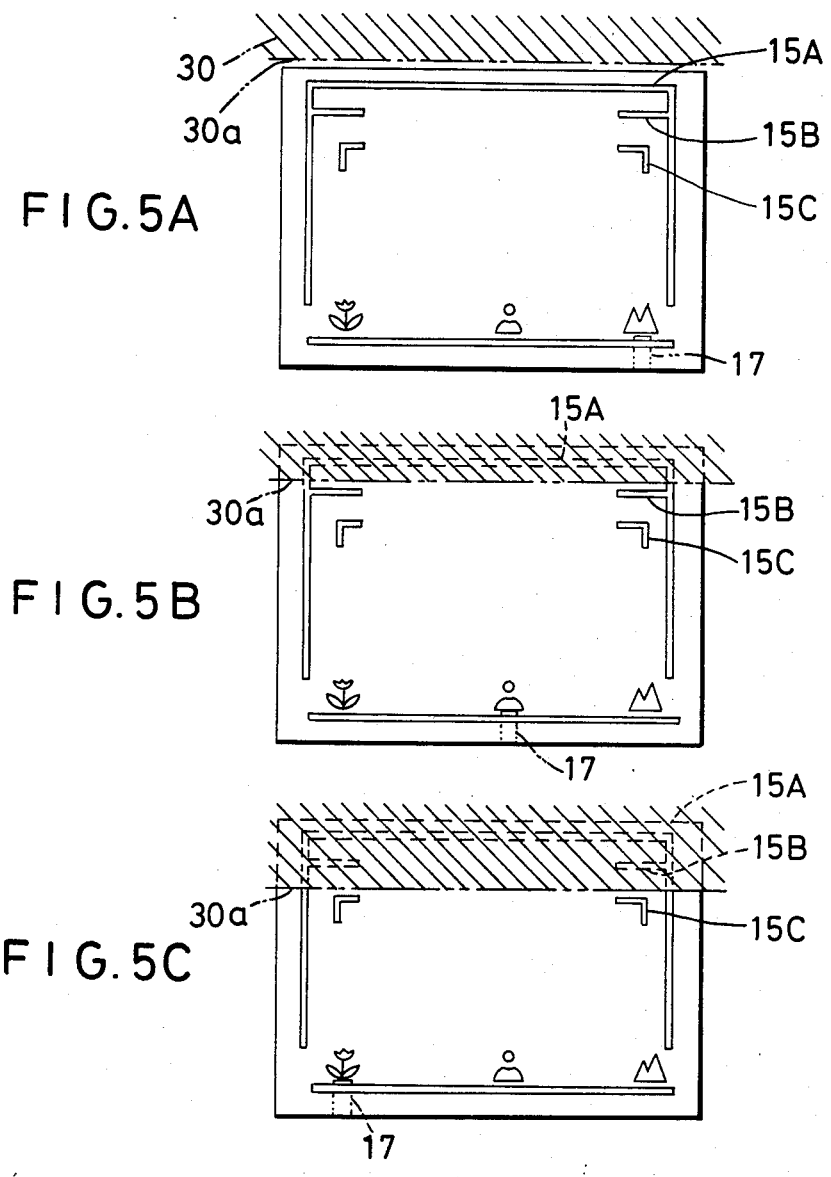
FIGS. 5A, 5B and 5C illustrate the finder view field and the shielding action of the shield plate.

When the photo-taking lens 1 is at the infinity position, the distance pointer 17 points to the long distance range symbol (mountain) of the distance zone mark 16 as shown in FIGS. 1 and 2 and the shield plate 30 is placed at the retracted position above the main view field frame 15A. Accordingly, the view field of the finder may be observed without the main view field frame 15A and the auxiliary view field frame 15B being cut off by the shield plate 30, as shown in Figure 5A.

When the photo-taking lens at the infinity position is moved toward the object to be photographed with the base plate 5 for the purpose of distance adjustment, the first rack 7 provided on a side of the interlocking strut 6 moves in the direction of arrow A. Accordingly, the second rack 10 moves to the left (in the direction of arrow B) through the interlocking gears 8 and 9, and the distance pointer 17 is displaced to the left with the pointer bed 20. When the photo-taking lens 1 has been moved with the base plate 5 to a short distance position in which the half figure of the object to be photographed is close to the photographed picture plane, the distance pointer 17 points to the short distance range symbol (half figure) as shown in Figure 5B.

When the distance pointer 17 moves to the short distance range symbol (half figure) position with the pointer bed 20, the stylus 32 arrives at the first stepped portion 20B. Accordingly, the shield plate 30 shields the upper portion of the main view field frame 15A, and the lower edge 30a thereof arrives at a position just above the auxiliary view field frame 15B. Thus, the object to be photographed does not vanish, but only the upper portion of the main view field frame 15A disappears and therefore, the observer can determine the photographing picture plane by the use of the auxiliary view field frame 15B without any error and a proper picture plane having its parallax modified is obtained.

Figure 4:
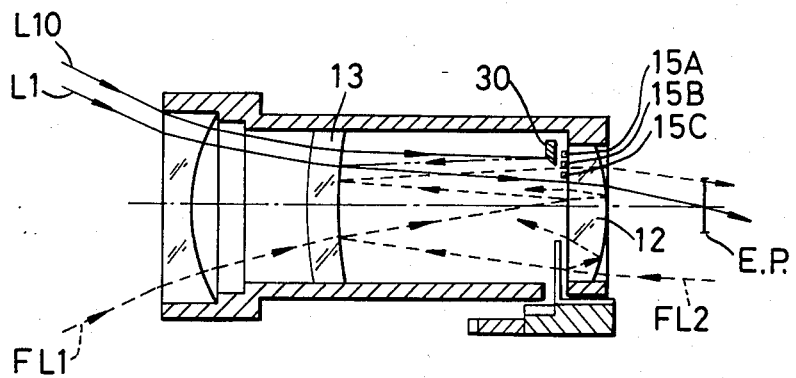
FIG. 4 illustrates the paths of the flare light in the finder optical system of FIG. 3 and the reflected light from the shield plate.

When the photo-taking lens 1 is further moved to the proximity range, the pointer bed 20 correspondingly moves to the left. Along therewith, the distance pointer 17 further moves to the left and points to the proximity range symbol (flower). In this position, the stylus 32 arrives at the second stepped portion 20C. At this time, the shield plate 30 shields the upper portion of the main view field frame 15A and the auxiliary view field frame 15B as shown in FIG. 5C, and the lower edge 30a thereof arrives at a position just above the proximity range view field frame 15C. Accordingly, in this case, the observer can obtain a photographing picture plane having its parallax modified by the use of the proximity range view field frame 15C without being encumbered by the other view field frames. The surface of the shield plate 30 is colored in white or light gray for the reason set forth below in detail.

Where the finder optical system is constructed in the albada type as in the above-described embodiment, the view field frames, etc. are observed in the same state as that in which they are observed through a thin white film, due to flare. As the causes of this flare, mention may be made of a case where, as indicated by broken lines in FIG. 4, a light ray FL1 incident from the object side is reflected by the front and back surfaces of the eyepiece and is further reflected by the albada mirror 13 and enters the eye, and a case where a reverse incident ray FL2 incident through the eyepiece 12 or a light ray resulting from that reverse incident light being repetitively reflected in the eyepiece 12 is reflected by the albada mirror 13 and enters the eye.

When a part of the view field frame is shielded by the shield plate 30, part of said flare is cut out with the reflected light from said part of the view field frames. Accordingly, in the finder view field, the part of said flare which has been cut out and the part of said flare which is not cut out are clearly distinguished and are observed, with cumbersome irregularity of density being emphasized in the observation view field. To cause this irregularity of density to disappear, the design may be such that the intensity of light of the image of the shield plate 30 reflected by the albada mirror 13 and the intensity of said flare become substantially equal to each other and the reflected light from the shield plate 30 and the flare light get mixed with each other. Assuming that the eyepiece which is a cause of the flare is of one-piece construction, the total of the reflectances from the front and back surfaces thereof is about 8% and therefore, it is necessary that the reflectance of the surface of the shield plate 30 be at least about 8%. Further, actually, the intensity of the light incident from the eye side is often unexpectedly great (for example, in a case where photographing is effected with the sum at the back) and the intensity of the flare is further increased.

To cause the reflected light from the shield plate 30 to match this intensity of the flare, it has been found as a result of an experiment that it is necessary to make the surface of the shield plate 30 into a non-color of high brightness (desirably a delustered diffusing surface) such as white or at least light gray. Also, depending on the characteristic of the albada mirror 13, there exists a finder optical system in which the color tones of transmitted light and reflected light differ from each other, but in such case, it is effective to adjust the color tone of the surface of the shield plate 30 so as to match the color tone of the view field.

Also, the surface of the light ray intercepting member in the optical system is usually subjected to the black delustering treatment, but such black delustering treatment cannot eliminate the irregularity resulting from the flare in the view field unless the eyepiece is provided with a very expensive reflection reducing multi-layer coat. However, the irregularity of density in the view field can be eliminated inexpensively and easily by making the surface of the shield plate 30 white or light gray so as to provide a surface reflected light matching the intensity of the flare, as described above. Even if the surface of the shield plate 30 is made white or gray, the condition of visibility of the object to be photographed which is observed will not be affected.

To apply the above-described parallax correcting device to a two-focus camera in which the focal length of the photo-taking lens is changeable, it is necessary to change over the magnification of the finder in conformity with the change of the focal length of the photo-taking lens.

Figure 6:
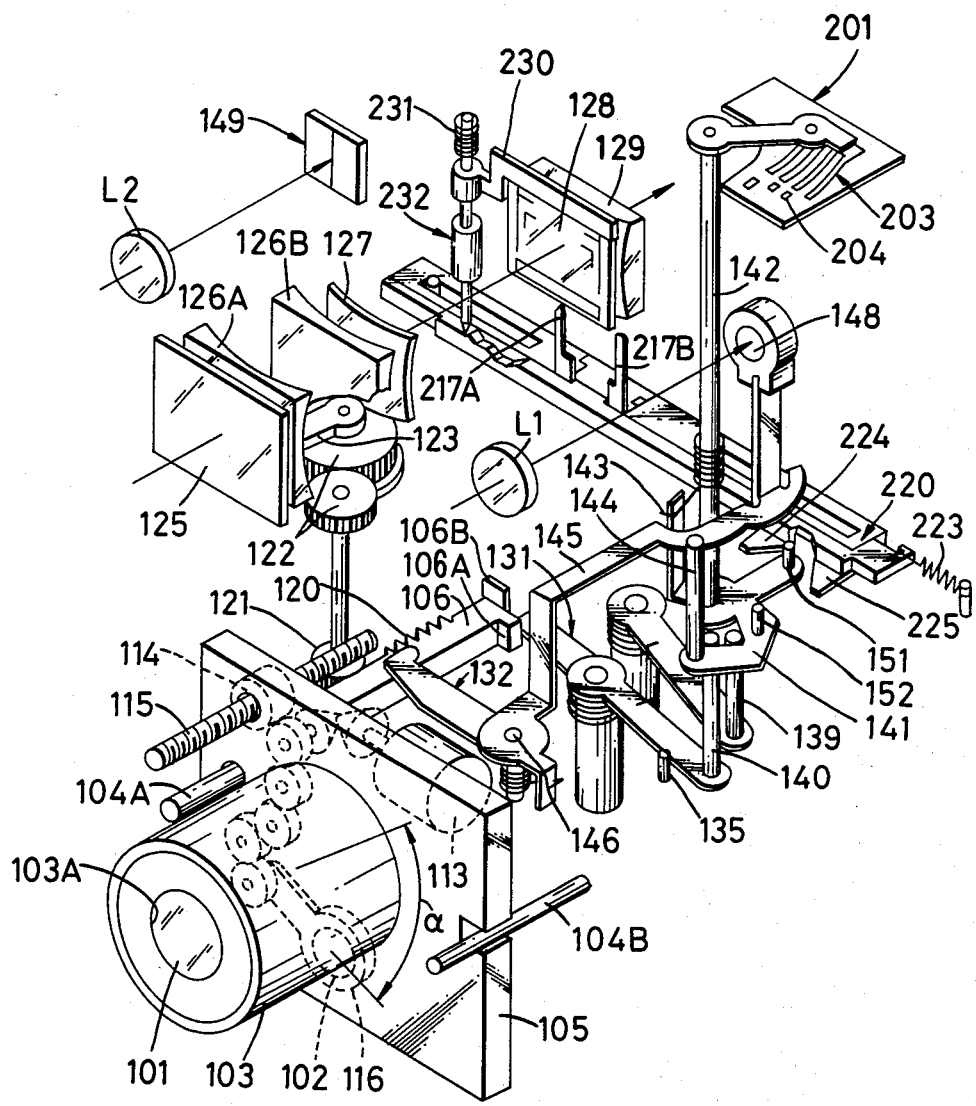
FIG. 6 is a perspective view of a second embodiment of the present invention.
Figure 7:
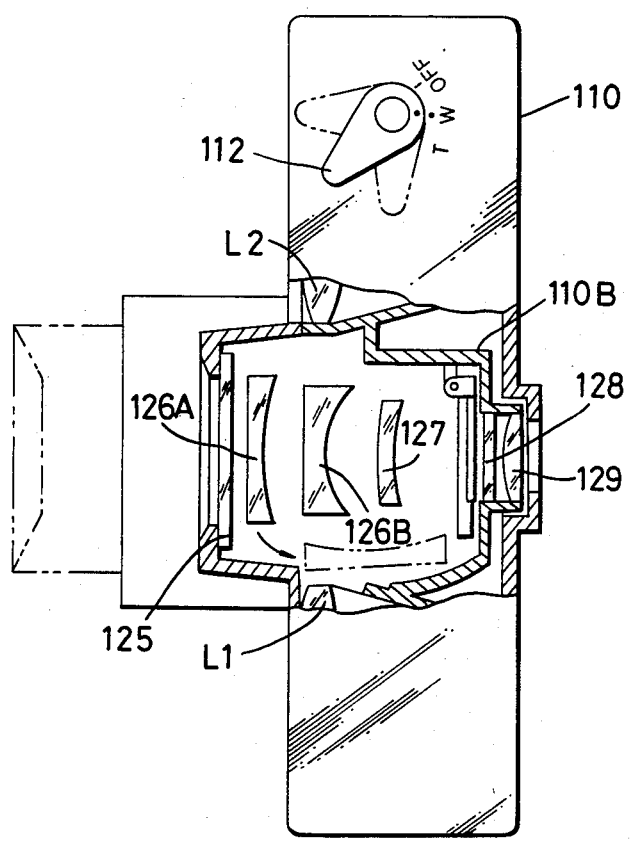
FIG. 7 is a partly broken-away top plan view of the camera of FIG. 6.

FIGS. 6 and 7 show a second embodiment of the present invention applied to a two-focus type camera provided with an automatic focus adjusting device. FIG. 6 shows the wide angle state.

In FIGS. 6 and 7, the photo-taking lens comprises a main optical system 101 and an auxiliary optical system 102 removably provided rearwardly of the main optical system, and a lens barrel 103 containing the main optical system 101 therein is secured to a base plate 105 guided for movement in the direction of the optic axis by two guide shafts 104A and 104B. A strut 106 elongated in the direction of the optic axis is projectedly provided on the back of the base plate 105, and one guide shaft 104A extends through the strut 106 and supports the base plate 105 so that the base plate is just opposed to a film surface, not shown.

The lens barrel 103 is constructed so that a focal length selecting lever 112 provided on the upper surface of a camera body 110 as shown in FIG. 7 controls, through a switch device, not shown, a reversible motor 113 (see FIG. 6) which provides a drive source for moving the base plate 105 and moving the auxiliary optical system 102 in a direction orthogonal to the optic axis.

The base plate 105 is designed to be moved in the direction of the optic axis in accordance with the lead of a feed screw 115 threadably engaged with a drive gear 114 operatively associated with the revolution of the reversible motor 113, and a lens frame 116 holding the auxiliary optical system 102 is designed to be displaced along the back of the base plate 105 by an angle α in FIG. 6 through a reduction gear train and insert the auxiliary optical system 102 onto the optic axis of the main optical system 101. The lens frame 116 is designed to be displaced in a direction perpendicular to the optic axis by a cam mechanism, not shown, only when the base plate 105 is moved beyond the distance adjustment range in the state of the short focal length (hereinafter, referred to as the "wide angle") of only the main optical system 101 and the long focal length (hereinafter referred to as the "telephoto") of the main optical system 101 plus the auxiliary optical system 102. These constructions are described in detail in U.S. application Ser. No. 772,710 filed on Sept. 5, 1985, now U.S. Pat. No. 4,643,555, issued Feb. 17, 1987.

When the index mark of the selecting lever 112 becomes opposed to the wide angle symbol "W" attached to the upper surface of the camera body 1 as shown in FIG. 7, the base plate 105 is placed at a reset position slightly transferred from the infinity position in the distance adjustment range in the wide angle state (hereinafter referred to as the "wide angle range"). Also, when the index mark of the selecting lever 112 becomes coincident with the telephoto symbol "T", the base plate 105 is moved beyond the close distance position in the wide angle range and arrives and stops at a reset position somewhat short of the infinity position in the distance adjustment range in the telephoto state (hereinafter referred to as the "telephoto range"). At that time, the auxiliary optical system 102 is inserted onto the optic axis of the main optical system 101. When the selecting lever 112 is caused to coincide with the "OFF" symbol, the base plate 105 is transferred and stops at the reset position in the wide angle range and at the same time, a lens barrier is closed.

When the base plate 105 is moved forwardly beyond the proximity distance position (close distance position) in the wide angle range, a rack 120 provided on a side of the interlocking strut 106 protruding from the base plate 105 meshes with a pinion gear 121 and comes out of mesh engagement with the pinion gear 121 shortly before it arrives at the infinity position in the telephoto range. The rotation of the pinion gear 121 is transmitted through a reduction gear train 122 to a converting lever 123 for removably inserting the first objective 126A of the finder optical system onto the optic axis of the finder.

The finder optical system comprises a negative first objective 126A and a second objective 126B provided rearwardly of a transparent window plate 125, an albada mirror 127 having a half-transmitting concave surface, a view field frame plate 128 provided with a view field frame and a distance zone mark, and a positive eyepiece 129. The first objective 126A is displaceable from the optic axis of the finder to a retracted position off the optic axis indicated by dots-and-dash line in FIG. 7, by the converting lever 123. When the first objective 126A is inserted onto the optic axis, the combined focal length of the first objective 126A and the second objective 126B becomes short, and the rate of variation in magnification to the focal length of the second objective 126B is in inverse proportion to the variation in the focal lengths of the photo-taking lenses 101 and 102 (the variation in the image magnifications of the photo-taking lenses).

Figure 8:
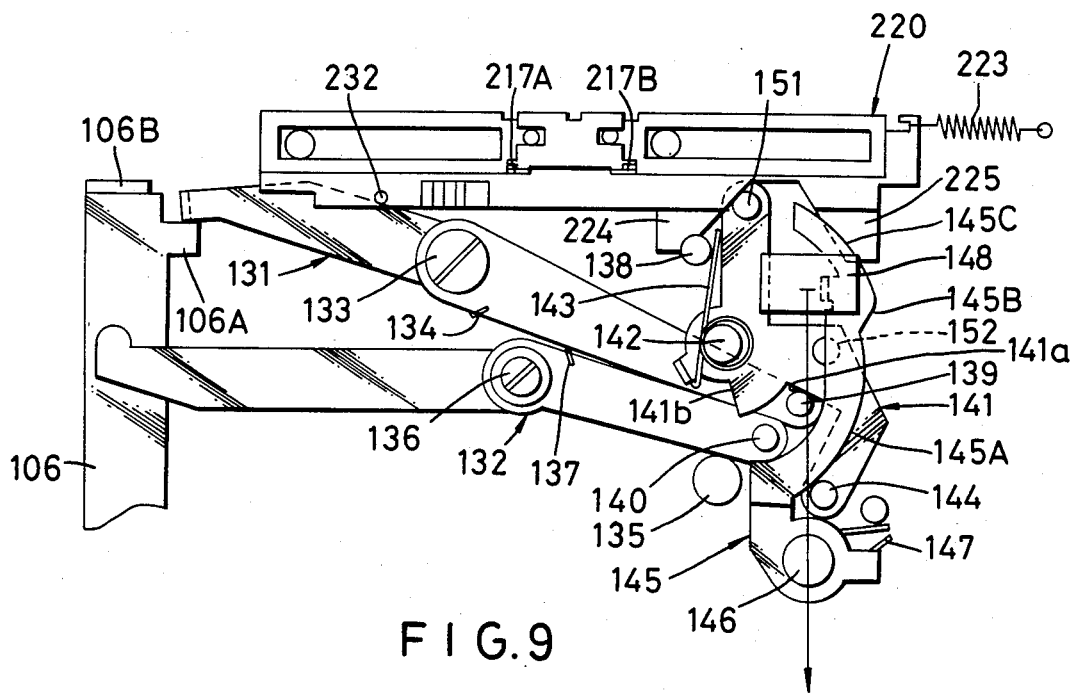
FIG. 8 is a plan view of the intermittent locking mechanism in FIG. 6 in the wide angle state.

An interlocking lever 131 for wide angle is in engagement with a projection 106A provided on the fore end portion of the interlocking strut 106. Also, a projection 106B is designed to be engaged with an interlocking lever 132 for telephoto in the course in which the base plate 105 is moved to the reset position in the telephoto range. The lever 131, as shown in Figure 8, is supported by a pin shaft 133 and is biased counter-clockwise by a coil spring 134, and the pivotal movement thereof is limited by a limit pin 138. The lever 132 is supported by a pin shaft 136 and is biased clockwise by a coil spring 137, and the pivotal movement thereof is limited by a limit pin 135. Further, pins 139 and 140 are studded in the levers 131 and 132, respectively. A pivotable lever 141 engaged with these pins 139 and 140 is secured to one end of a rotary shaft 142 and is biased clockwise by a coil spring 143.

The pin 139 urges an engaging portion 141a to thereby pivot the pivotable lever 141 counter-clockwise. Also, the pin 140 urges an engaging portion 141b to thereby pivot the pivotable lever 141.

A sliding pin 144 engageable with a cam lever 145 is studded in the pivotable lever 141. The cam lever 145 has one end thereof supported by a pin shaft 146 and is normally biased clockwise by a coil spring 147. The cam lever 145 has a light-emitting element 148 such as an infrared light emitting diode provided on the free end thereof. Further, as shown in FIG. 8, a cam 145A for wide angle, a cam 145B for returning the light-emitting element and a cam 145C for telephoto are continuously formed on the surface of the cam lever 145 which is engaged with the sliding pin 144.

An infrared spot light is projected by the light-emitting element 148 through a projection lens L1 provided on the axis of the pin shaft 146, and the infrared spot light reflected from the object to be photographed is received by a light-receiving element 149 comprising two photodiodes through a light-receiving lens L2 (FIG. 6). These elements 145, 148, 149, L1 and L2 together constitute an angle measuring type distance detecting device.

Pins 151 and 152 for moving a pointer bed 220 which will later be described in detail are studded in the pivotable lever 141. The radius of rotation of the pin 152, as compared with the radius of rotation of the pin 151, is substantially in inverse proportion to the focal length of the photo-taking lens. Also, the sliding brush of an encoder 201 which puts out an object distance signal on the basis of the angle of rotation of the pivotable lever 141 is secured to the upper end of the rotary shaft 142 supporting the pivotable lever 141 and rotatable therewith. The encoder 201 includes four brushes 203 and a conductor pattern 204, and in accordance with the distance signal put out from this encoder 201, a stop, not shown, which is provided within the photo-taking lens barrel 103 is controlled on the basis of the flash guide number.

Figure 9:
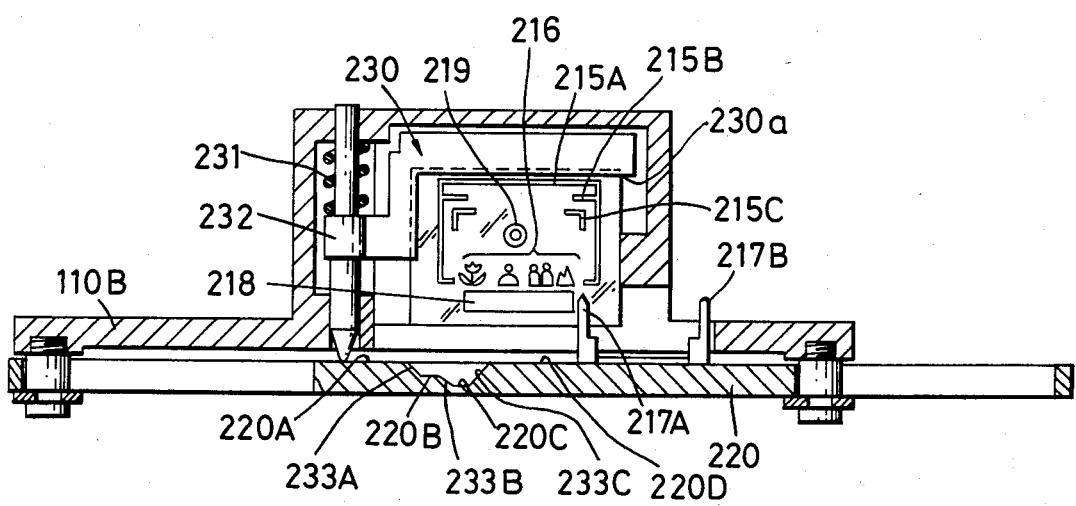
FIG. 9 is a cross-sectional view of the shield plate moving mechanism of FIG. 6.

On the view field frame plate 128 in the finder optical system 125–129, shown in FIG. 6, there are provided, as shown in FIG. 9 a main view field frame 215A for long distance, an auxiliary view field frame 215B for short distance range different in position in conformity with the parallax and a view field frame 215C for proximity range, and further a distance zone mark 216 indicating the range of the object to be photographed which is reflected in the photographing picture plane in conformity with the photographing distance. This distance zone mark 216 comprises a "mountain" symbol representing the long distance range including infinity, a "plural-figure" symbol representing the medium distance range, a "half figure" symbol representing the short distance range, and a "flower" symbol representing the proximity range, and the distance indicating symbol row of this distance zone mark 216 is pointed to by a distance pointer 217A for wide angle and a distance pointer 217B for telephoto. These two distance pointers 217A and 217B are movable to the left and right along a display frame 218 provided as a reflecting surface below the distance zone mark 216. A measured distance zone mark 219 indicating the range of measured distance of the object field measured by a distance detecting device is provided on the central portion of the main view field frame 215A.

The distance pointers 217A and 217B are formed by transparent members of different colors or have their tip ends formed into different shapes so that the finder observer can distinguish them from each other. The pointers 217A and 217B are provided on a pointer bed 220 at an interval wider than the interval from the long distance range symbol "mountain" to the proximity range symbol "flower" of the distance zone mark 216.

The pointer bed 220, as in the first embodiment, is slidably mounted on the underside of a finder box 110B (see FIG. 7) which holds the finder optical system 126B–129, and is normally biased rightwardly as viewed in FIG. 8 by a tension coil spring 223. Also, on a side of the pointer bed 220, there are provided a protruding cam 224 for wide angle with which the pin 151 of the pivotable lever 131 is engageable and an engaging protruding cam 225 for telephoto with which the pin 152 is engageable.

The inclination of the cam surface of the cam 224 is formed so that the amount of movement of the pointer bed 220, i.e., the amount of leftward displacement of the distance pointer 217A for wide angle, is reduced particularly between the short distance range symbol (half figure) and the proximity range symbol (flower), relative to the amount of leftward displacement of the pivotable pin 151 for wide angle.

Immediately in front of the view field frame plate 128 in the finder optical system, a shield plate 230 vertically displaceable on the upper portion of the main view field frame 215A and the front face of the auxiliary view field fram 215B is provided as shown in FIGS. 6 and 9, and the shield plate 230 is mounted on a stylus 232 vertically slidably provided on the finder box and is biased downwardly by a coil spring 231.

On the pointer bed 220, as in the first embodiment, there are formed two stepped portions 220B and 220C through inclined surfaces 223A and 233B continuous from the upper surface 220A of the pointer bed 220.

Since the stylus 232 slides on the upper surface 220A of the pointer bed 220 until the distance pointer 217A for wide angle is displaced leftwardly beyond the long distance range symbol (mountain) of the distance zone mark 16 as viewed in FIG. 9 and arrives at the medium distance symbol (plural figures), the shield plate 230 does not lower. When the distance pointer 217 for wide angle moves leftwardly as viewed in Figure 9 beyond the medium distance symbol (plural figures), the stylus 232 lowers along the first inclined surface 233A, and when the distance pointer 217 for wide angle arrives at a position in which it points to the short distance range symbol (half figure), the stylus arrives at the first stepped portion 220B and at that time, the shield plate 230 lowers to a position in which it covers the upper portion of the main view field frame 215A. Further, when the distance pointer 217 for wide angle is displaced to a position in which it points to the proximity range symbol (flower), the stylus lowers along the second inclined surface 223B and arrives at the second stepped portion 220C and at that time, the shield plate 230 lowers to a position in which it covers the auxiliary frame 215B also.

When the distance pointer 217 for wide angle is further displaced to the left as viewed in FIG. 9 and retracts to the outside of the display frame 218, the third inclined surface 233C of the pointer bed 220 pushes up the stylus 232 and, when the stylus arrives at the upper surface 220D of the pointer bed, the shield plate 230 returns to the original position shown in FIG. 9. The shield plate 230 has its surface treated in white or light gray for the same reason as that for the shield plate 30 in the first embodiment.

Where distance adjustment is to be effected in the telephoto state up to the proximity range in the wide angle state, the amount of protrusion of the photo-taking lens barrel 103 from the camera body 110 is very great and the moving mechanism becomes complicated. Accordingly, in this second embodiment, the moving mechanism for the base plate 105 is constructed so that in the telephoto range distance adjustment can be done from infinity to the short distance range.

Operation of the second embodiment will now be described.

Figure 11A:
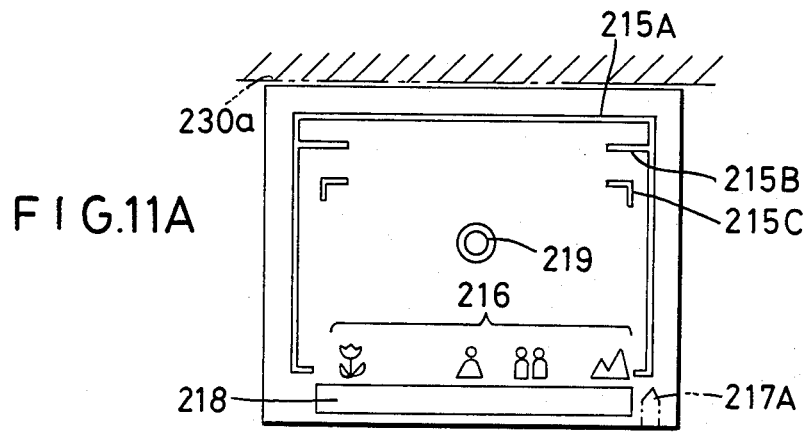
FIGS. 11A, 11B and 11C illustrate the finder view field and the shielding action of the shield plate.

When the focal length selecting lever 112 is operated and set to the wide angle position "W", the power source circuit is closed by a switch, not shown. In this state, the motor 113 does not revolve and the main optical system 101 and the base plate 105 are placed at their reset positions in the wide angle range, as shown in FIG. 6. Also, in this state, the distance pointer 217 is outside the display frame 218 as shown in FIG. 11A and is not observed. Further, the shield plate 230 is placed at its retracted position and the lower end edge 230a thereof lies outside the finder view field.

When a shutter release button, not shown, is half-depressed after the focal length selecting lever 112 has been set to the wide angle position "W", the distance detecting device is first operated and an infrared spot light is projected from the light-emitting element 148 toward the object to be photographed. Where an object to be photographed lying at a long distance is collimated by means of the distance measuring zone mark 219, the motor control circuit of the distance detecting device puts out a long distance signal and drives the motor 113, which moves the main optical system 101 to the infinity position in the wide angle range with the base plate 105.

When by this movement of the base plate 105 from the reset position to the infinity position, the projection 106A of the interlocking strut 106 is slightly moved toward the object to be photographed, the interlocking lever 131 for wide angle pivots counter-clockwise to thereby cause the pivotable lever 141 to slightly pivot counter-clockwise. By the counter-clockwise pivotal movement of the pivotable lever 141, the pin 151 displaces the pointer bed 220 to the left through the cam 224. Thereby, the distance pointer 217A for wide angle is moved from the position shown in Figure 11A into the display frame 218 and points to the long distance range symbol (mountain).

When the release button is further depressed, the shutter is opened and closed and, when exposure is terminated, the reversible motor 113 revolves in a reverse direction and the base plate 105 returns to its reset position. Accordingly, the pointer bed 220 also returns to its original position.

Next, where an object to be photographed having a size substantially equal to that of a half-length is to be photographed over the full photographing picture plane, the camera is brought close to the object to be photographed to such a degree that the object to be photographed is well within the main view field frame 215A. In this case, parallax occurs and therefore, it is necessary to determine the upper limit position of the object to be photographed by the use of the auxiliary view field frame. When the release button, not shown, is half-depressed after, in such short distance range, the object to be photographed has been disposed within the distance measuring zone mark 219, the main optical system 101 is axially moved with the base plate 105 by the revolution of the motor 113 and the pivotable lever 141 pivots counter-clockwise through the intermediary of the interlocking lever 131 for wide angle. By this pivotal movement of the pivotable lever, the sliding pin 144 is turned about the rotary shaft 142. The cam lever 145 pivots clockwise in accordance with the cam shape of the cam 145A for wide angle which is in engagement with the sliding pin 144.

Thus, the infrared spot light from the light-emitting element 148 projected through the projection lens L1 irradiates the object to be photographed, and the reflected spot light from the object to be photographed is imaged on the light-receiving element 149 through the light-receiving lens L2. This imaged light spot moves at first from the end of one light detecting diode toward the other light detecting diode and, when the quantities of light received by these two light detecting diodes have become coincident with each other, the motor 113 is stopped and the distance adjustment of the main optical system 101 is terminated.

Figure 11B:
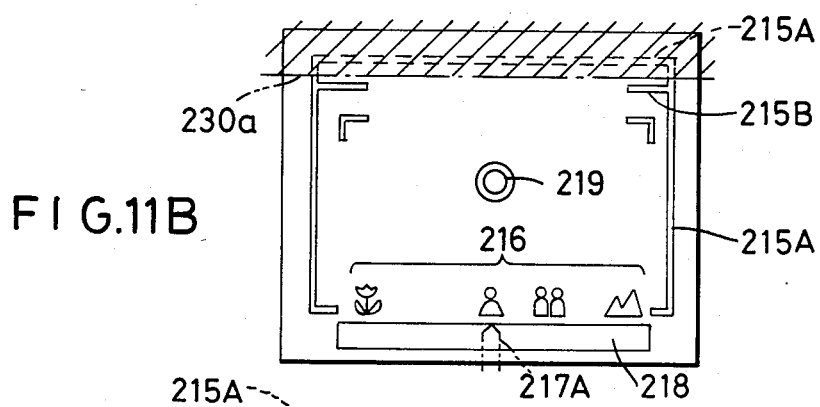

On the other hand, by the counter-clockwise pivotal movement of the pivotable lever 141, the pivotable pin 151 for wide angle moves the pointer bed to the left through the protruding cam 224 for wide angle and moves the pointer 217A for wide angle to the position shown in FIG. 11B.

Also, in FIG. 9, the stylus 232 arrives at the first stepped portion 220B. Accordingly, the lower end edge 230a of the shield plate 230 moves to a position in which it covers the upper portion of the main view field frame 215A.

Where photography is to be effected with the camera brought close to an object to be photographed such as a flower or the like for closeup-photography, the amount of axial movement of the main optical system 101 becomes very great depending on the case of the short distance range photography and the image magnification of the photo-taking lens greatly varies to a significant degree. Therefore, parallax becomes great and at the same time, the range to be photographed becomes narrow even with the same photo-taking lens. In order to cope with this, use is made of a view field frame 215C for proximity range in which parallax is modified and which is smaller than the main view field frame 215, as shown in FIG. 9.

Figure 11C:
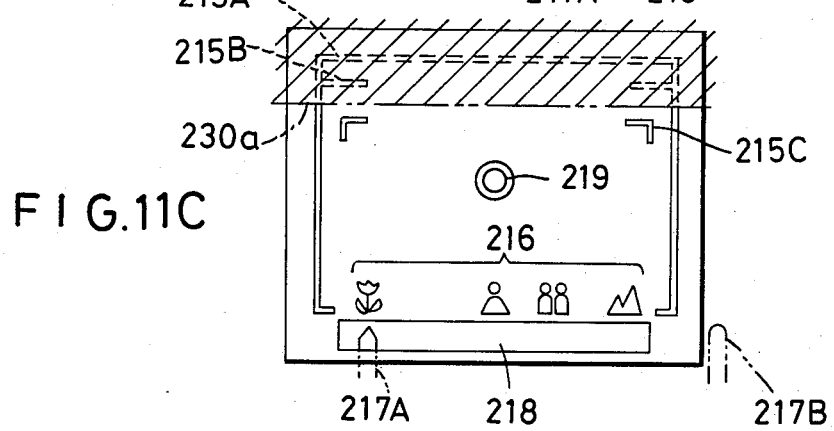

When the release button is half-depressed after the camera has been brought close to the object to be photographed until the object to be photographed becomes close up, the pin 151 moves the pointer bed 220 to the left. At this time, the main optical system 101 is greatly axially moved with the base plate 105 and along therewith, the angle of rotation of the pivotable lever 141 also becomes great, but the amount of leftward movement of the pointer bed 220 becomes relatively small due to the inclination of the cam surface of the protruding cam 224 for wide angle. Thus, the pointer 217A does not retract out of the display frame 218 but arrives at a position in which it points to the proximity range symbol (flower), as shown in FIG. 11C. At this time, the stylus 232 arrives at the second stepped portion 220C. Thus, the shield plate 230 shields the upper portion of the main view field frame 215A and the auxiliary view field frame 215B.

The change-over of the focal length of the photo-taking lens and the changing of the finder magnification will now be described.

When the selecting lever 112 is rotatively displaced to the telephoto symbol "T" position, the motor 113 revolves and moves the base plate 105 to the reset position in the telephoto range beyond the proximity distance position in the wide angle range. Also, the revolution of this motor 113 is transmitted to the moving lens frame 116 through the reduction gear train, whereby the auxiliary optical system 102 is rotated counter-clockwise by an angle α and is inserted onto the optic axis of the main optical system. By this insertion of the auxiliary optical system 102, the focal length of the photo-taking lens is changed over from the wide angle state to the telephoto state.

Figure 10:
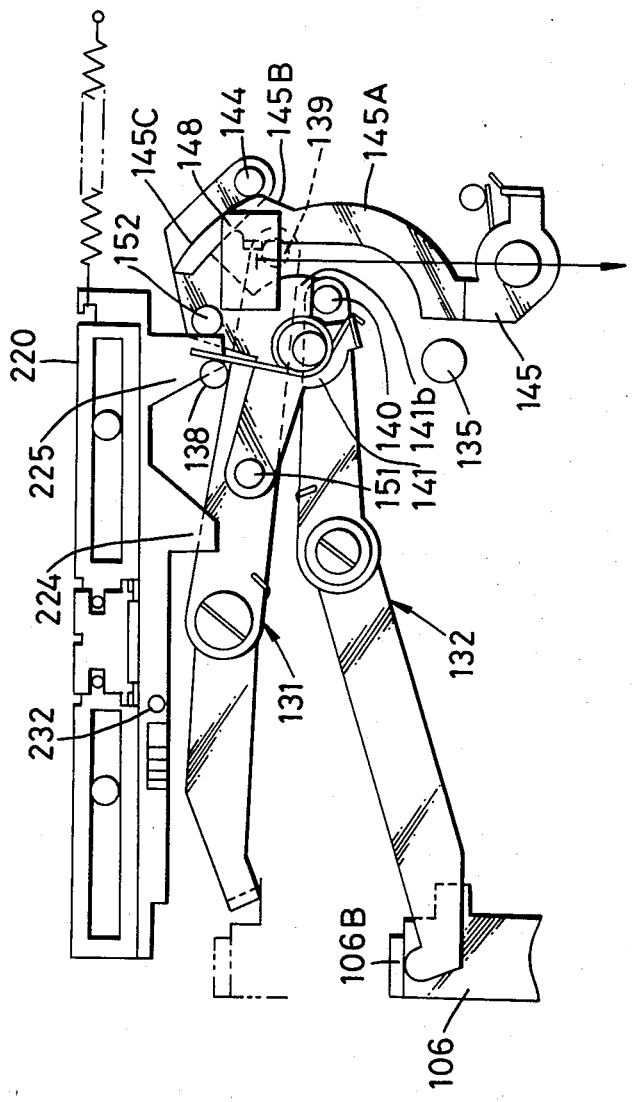
FIG. 10 is a plan view of the intermittent interlocking mechanism of FIG. 8 in the telephoto state.

By the movement of the base plate 105 beyond the wide angle range, the lever 131 comes to bear against the limit pin 138 as shown in FIG. 10. Subsequently, the second engaging projection 106B of the struct 106 causes the interlocking lever 132 for telephoto to pivot counter-clockwise. By this pivotal movement, the pin 140 comes to bear against the second engaging surface 141b of the pivotable lever 141 to thereby cause the pivotable lever 141 to pivot counter-clockwise again, and when the base plate 105 has arrived at the reset position in the telephoto range, the motor 113 is stopped by a stop signal from the motor control circuit, not shown, and therefore the counter-clockwise pivotal movement of the pivotable lever 141 is stopped.

By the counter-clockwise pivotal movement of this pivotable lever 141, the pin 152 further displaces the pointer bed 220 through the intermediary of the protruded portion 225 and stops the pointer bed 220 at a position in which the pointer 217A is retracted beyond the proximity range symbol (flower). In this position, the distance pointer 217B for telephoto is placed at the same position as that assumed by the pointer 217A in FIG. 11A. Also, the stylus 232 supporting the shield plate 230 is moved up along the third inclined surface 233C, and then arrives at a position in which it comes into engagement with the upper surface 220D of the pointer bed as shown in FIG. 9. Thereby, the shield plate 230 is returned to its original position shown in FIG. 9.

Further, the sliding pin 144 arrives at the base position of the cam 145C for telephoto beyond the cams 145A and 145B of the cam lever 145, as shown in FIG. 10. Thereby, the light-emitting element 148 is returned to the same reset position as shown in FIG. 8.

On the other hand, when the base plate 105 is moved beyond the wide angle range, the rack 120 provided on a side of the interlocking struct 106 meshes with the pinion gear 121 and causes the converting lever 123 to pivot counter-clockwise through the intermediary of the reduction gear train 122. By this counter-clockwise pivotal movement of the converting lever 123, the first objective 126A is retracted out of the finder optical path as indicated by phantom line in FIG. 7. Thereby, the image magnification of the finder optical system is enlarged. When the first objective 126A arrives at its retracted position outside the finder optical path, it is fixed at that position by a click mechanism, not shown, and at the same time, the rack 120 separates from the pinion gear 121 and the mesh engagement therebetween is released. Accordingly, even if the base plate 105 is further moved for distance adjustment, the first objective 126A remains at its retracted position and does not move.

The distance adjustment in the telephoto range is accomplished by half-depressing the unshown release button as in the case of the distance adjustment in the wide angle range, thereby effecting distance measurement by the distance detecting device 145-149 and at the same time, moving the base plate 105. In this case, the pointer bed 220 is displaced in accordance with the rotation of the pin 152, and the pointer 217B points to the distance zone mark symbol corresponding to the image magnification based on the combined focal length of the main optical system 101 and the auxiliary optical system 102.

Here, the relation between the amount of movement of the base plate 105 during the distance adjustment in the wide angle state and the telephoto state of the photo-taking lens and the amounts of displacement of the distance pointers 217A and 217B which point to the distance zone mark 216 will be studied.

If the focal length of the photo-taking lens is f and the photographing distance to the object to be photographed is R and the amount of axial movement of the photo-taking lens from the infinity position is Δ and the then reduction magnification of the image of the object to be photographed (hereinafter referred to as the "image magnification") is X, $$\Delta = f^2/(R-f) \tag{1}$$

$$X = f/(R-f) \tag{2}$$

Also, if the amount of movement of the distance pointers 217A and 217B from the infinity (∞) position is Z, $$Z = k \cdot \Delta \quad (k \text{ is the interlocking ratio}) \quad (3)$$

From equations (3) and (1), the following relation is obtained:

$$Z = k \cdot f^2/(R-f) \quad (4)$$

If the amount of movement of the distance pointer 217A for wide angle is $Z_W$ and the amount of movement of the distance pointer 217B for telephoto is $Z_T$ and the interlocking ratios of these distance pointers are $k_1$ and $k_2$ and the focal length and the photographing distance in the wide angle state are $f_W$ and $R_W$, respectively, and the focal length and the photographing distance in the telephoto state are $f_T$ and $R_T$, respectively, the following relations are obtained from equation (4):

$$\left. \begin{array}{l} Z_W = k_1 \cdot f_W^2/(R_W - f_W) \\ Z_T = k_2 \cdot f_T^2/(R_T - f_T) \end{array} \right\} \quad (5)$$

Assuming that the distance pointer 217A for wide angle and the distance pointer 217B for telephoto point to the same distance symbol in the distance zone mark 216 and that $Z_W = Z_T$, $$k_1 \cdot f_W^2/(R_W - f_W) = k_2 \cdot f_T^2/(R_T - f_T) \quad (6)$$

The photographing distance to the object to be photographed which corresponds to each distance symbol of the distance zone mark 216 indicating the range in which the object to be photographed is photographed differs between the wide angle state and the telephoto state. For example, where the half figure of the object to be photographed is to be photographed on the full film picture plane as indicated in the short distance range symbol, distance adjustment is accomplished by bringing the camera close to the object to be photographed in the wide angle state and bringing the camera far from the object to be photographed in the telephoto state. Where photo-taking lenses of different focal lengths $f_W$ and $f_T$ are used to image the same object to be photographed at an equal size on the film picture plane at the photographing distances $R_W$ and $R_T$, the image magnifications $X_W$ and $X_T$ of the two are equal to each other and therefore, the following equation is obtained from equation (Z):

$$f_W/(R_W - f_W) = f_T/(R_T - f_T) \quad (7)$$

If this equation (7) is substituted into equation (6), the following equation is obtained:

$$k_2 = k_1 \cdot f_W/f_T \quad (8)$$

That is, in the case of the telephoto state, the distance zone mark for wide angle can be used in common for telephoto by adding an interlocking ratio converting mechanism which is in inverse proportion to the focal length ($f_W/f_T$) to the interlocking mechanism for the base plate 105 and the pointer bed 220 in the case of the wide angle state. For this purpose, the radius of rotation of the pivotable pin 151 for wide angle and the radius of rotation of the pivotable pin 152 for telephoto are formed so as to be in inverse proportion to the focal length.

Also, as is apparent from equations (1) and (2), even in the distance adjustment at the same focal length, when the photographing distance R is sufficiently great as compared with the focal length f, the amount of axial movement $\Delta$ of the photo-taking lens and the image magnification X are substantially in inverse proportion to the photographing distance. However, if the camera is brought close to the object to be photographed to such a degree that the focal length f cannot be neglected relative to the photographing distance R, the value of the denominator (R−f) of equations (1) and (2) sharply becomes smaller and therefore, the amount of axial movement $\Delta$ and the image magnification X both become extremely great. Accordingly, the pointer 217A for wide angle operatively associated with the axial movement of the photo-taking lens is designed such that the amount of movement $Z_W$ thereof reduces the predetermined interlocking ratio $k_1$ in the vicinity of the proximity range symbol (flower) by the cam surface of the cam 224 engaged with the pin 151, and that in the telephoto state, the distance pointer 217B for telephoto operatively associated with the base plate 105 with the interlocking ratio $k_2$ points to the long distance range symbol (mountain) to the short distance range symbol (half figure) of the distance zone mark 216.

Now, when the distance pointer 217B for telephoto has arrived at a position in which it points, for example, to the short distance range symbol (half figure), the following relation is obtained from equation (7):

$$R_T = (f_T/f_W) \cdot R_W \quad (9)$$

That is, where the same person is to be photographed at the same size with the focal length being changed, the camera is placed at a position whereat the photographing distance $R_T$ in the telephoto state is far from the photographing distance $R_W$ in the wide angle state by the ratio of the focal length. Accordingly, the parallax of the finder becomes smaller than in the case of the wide angle state and therefore, the main view field frame 215A may be used to effect framing without the auxiliary view field frame 215B being used. Therefore, in the telephoto state, there is no stepped portion on the upper surface 220D of the pointer bed 220 which is in contact with the stylus 232. Accordingly, in the telephoto state, even if distance adjustment is effected, the shield plate 230 does not enter into the finder view field and the main view field frame 215 is not shielded.

In the above-described second embodiment, the change-over of the finder magnification by the objective is effected in response to the change-over of the focal length of the photo-taking lens and therefore, in the telephoto state also, the main view field frame 215A in the wide angle state can be used in common.

What we claim is:

1. A camera comprising:
    a photo-taking lens system having an optic axis and movable along said optic axis for focusing;
    viewfinder means including an objective having an optic axis different from the optic axis of said photo-taking lens system, a finder eyepiece, an albada mirror disposed between said objective and said eyepiece, a first pattern provided to indicate the range of a photographing picture plane obtained when an object to by photographed lying in a predetermined distance range is photographed within an observation view field formed through said objective, a second pattern provided to indicate the range of a photographing picture plane obtained when an object to be photographed lying outside said predetermined distance range is photographed within said observation view field, and optical means for directing light from said first pattern and said second pattern to said finder eyepiece; and preventing means responsive to movement of said photo-taking lens system to prevent viewing of at least a part of said second pattern when said photo-taking lens system is focused to the object to be photographed lying in said predetermined distance range, said preventing means including a light-intercepting member disposed between said second pattern and said albada mirror so as to intercept light along an optical path passing through said objective and said albada mirror to said second pattern and having a substantially non-colored high-brightness surface opposed to said albada mirror.

2. A camera according to claim 1, wherein said preventing means further includes means for retractably inserting said light-intercepting member in the optical path in response to movement of said photo-taking lens system.

3. A camera according to claim 1, wherein said viewfinder means further includes zone mark indicating means for indicating a plurality of characters representing distance zones of the object to be photographed within said observation view field, and means responsive to movement of said photo-taking lens system to select one of said characters and indicate it within said observation view field, and said preventing means responds to said indicating means.

4. A camera comprising:
a photo-taking lens system having an optic axis;
viewfinder means including an objective having an optic axis different from the optic axis of said photo-taking lens system, a finder eyepiece, an albada mirror disposed between said objective and said eyepiece, a first pattern provided to indicate the range of a photographing picture plane obtained when an object to be photographed lying in a predetermined distance range is photographed within an observation view field formed through said objective, a second pattern provided to indicate the range of a photographing picture plane obtained when an object to be photographed lying outside said predetermined distance range is photographed within said observation view field, and optical means for directing light from said first pattern and said second pattern to said finder eyepiece;
distance measuring means for measuring the distance to the object to be photographed which is observed through said viewfinder means; and
preventing means responsive to said distance measuring means to prevent viewing of at least a part of said second pattern when the distance measured by said distance measuring means is in said predetermined distance range, said preventing means including a light-intercepting member disposed between said second pattern and said albada mirror so as to intercept light along an optical path passing through said objective and said albada mirror to said second pattern and having a substantially non-colored high-brightness surface opposed to said albada mirror.

5. A camera according to claim 4, wherein said distance measuring means includes means producing an energy beam for scanning the object to be photographed, and means for receiving the energy beam reflected by the object to be photographed, and said preventing means responds to the scanning of said energy beam.

6. A camera according to claim 4, wherein said preventing means further includes means for retractably inserting said light-intercepting member in the optical path in response to movement of said photo-taking lens system.

7. A camera according to claim 4, wherein said viewfinder means further includes zone mark indicating means for indicating a plurality of characters representing distance zones of the object to be photographed within said observation view field, and means responsive to movement of said photo-taking lens system to select one of said characters and indicate it within said observation view field, and said preventing means responds to said indicating means.

8. A camera comprising:
a photo-taking lens system having an optic axis and movable along said optic axis for focusing;
viewfinder means including an objective having an optic axis different from the optic axis of said photo-taking lens system, first view field indicating means provided to indicate the range of a photographing picture plane obtained when an object to be photographed lying in a predetermined distance range is photographed within an observation view field formed through said objective, and second view field indicating means provided to indicate the range of a photographing picture plane obtained when an object to be photographed lying outside said predetermined distance range is photographed within said observation view field;
zone mark indicating means for indicating a plurality of characters representing distance zones of the object to be photographed within said observation view field;
a moving member having a pointer for selectively indicating said characters and displaced in response to movement of said photo-taking lens system so as to move said pointer along said characters;
cam means including a cam surface provided on said moving member and a cam follower displaced in accordance with said cam surface; and
preventing means responsive to said cam follower for preventing viewing of at least a part of said second view field indicating means when said photo-taking lens system is focused to the object to be photographed lying in said predetermined distance range.

9. A camera according to claim 8, wherein said moving member is displaced in a direction substantially perpendicular to said optic axis of said objective.

10. A camera according to claim 8, wherein said second view field indicating means includes a view field indicating pattern and optical means for forming the image of said pattern within said observation view field, and said preventing means includes shield means retractably inserted in an optical path between said pattern and said optical means.

* * * * *